United States Patent
Jourdan et al.

(10) Patent No.: US 7,080,236 B2
(45) Date of Patent: Jul. 18, 2006

(54) UPDATING STACK POINTER BASED ON INSTRUCTION BIT INDICATOR WITHOUT EXECUTING AN UPDATE MICROINSTRUCTION

(75) Inventors: Stephan J. Jourdan, Portland, OR (US); Alan B. Kyker, Davis, CA (US); Nicholas G. Samra, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 10/262,214

(22) Filed: Sep. 30, 2002

(65) Prior Publication Data

US 2004/0064681 A1 Apr. 1, 2004

(51) Int. Cl.
*G06F 9/312* (2006.01)

(52) U.S. Cl. .................. 712/202; 711/219; 712/225

(58) Field of Classification Search ................ 711/219, 711/220; 712/202, 225
See application file for complete search history.

(56) References Cited

U.S. PATENT DOCUMENTS

| 5,129,075 A | * | 7/1992 | Nishimukai et al. ........ 711/169 |
| 5,142,635 A | * | 8/1992 | Saini .......................... 712/225 |
| 5,687,336 A | * | 11/1997 | Shen et al. .................. 712/202 |

* cited by examiner

*Primary Examiner*—Kenneth S. Kim
(74) *Attorney, Agent, or Firm*—Erik M. Metzger

(57) ABSTRACT

A stack pointer update technique in which the stack pointer is updated without executing micro-operations to add or subtract a stack pointer value. The stack pointer update technique is also described to reset the stack pointer to a predetermined value without executing micro-operations to add or subtract stack a stack pointer value.

33 Claims, 5 Drawing Sheets

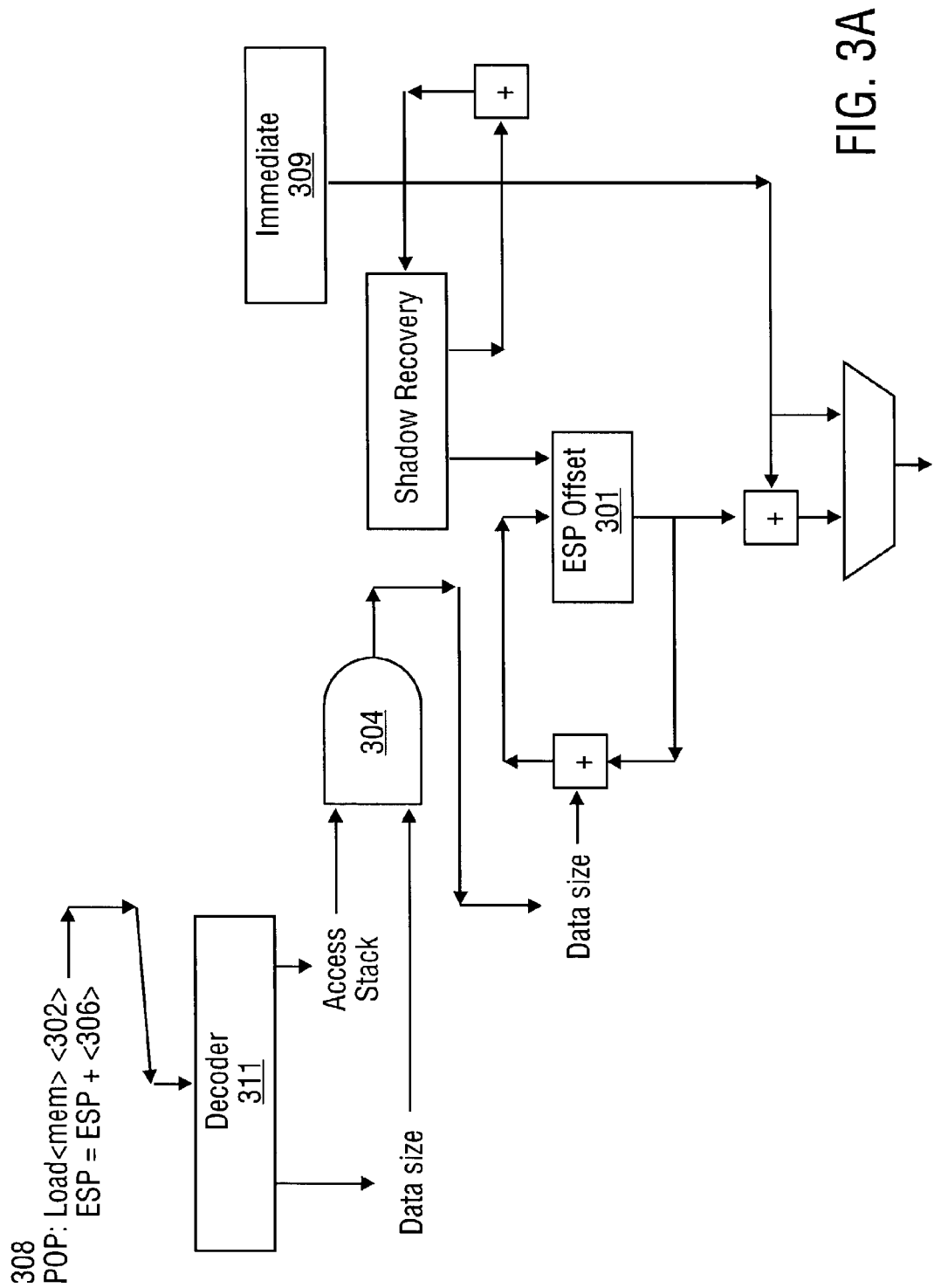

UPDATING STACK POINTER BASED ON INSTRUCTION BIT INDICATOR WITHOUT EXECUTING AN UPDATE MICROINSTRUCTION

FIELD

Embodiments of the invention relate to the field of microprocessor architecture. More particularly, embodiments of the invention relate to a technique for reducing the number of micro-operations (uops) that must be executed by a processor in order to update a stack pointer.

BACKGROUND

Programs executed by a processor often use memory regions known as stacks to store data temporarily. For example, a function call from a software routine may store (push) a return address onto a stack until the function is executed and then load (pop) the return address off of the stack in order to return to the routine and continue processing in program order.

Stacks are also used to store data to perform certain functions. For example, an addition of three numbers may push the sum of two of the numbers on the stack and then pop the result from the stack in order to add the sum to the third number.

In some stack architectures, a memory space, such as a register, is used to store the address of the next available space in a stack, the address of the last data that was pushed onto the stack, or the next data that is available on the stack to be popped from the stack. The address is often referred to as a stack pointer, because it, in effect, "points" to a location in a stack.

The stack pointer is updated whenever data is pushed onto or popped from the stack such that it points to the next appropriate location in the stack. In some prior art techniques, the stack pointer is updated by performing an addition or subtraction operation on the stack pointer value, depending upon whether a push or pop operation has taken place, respectively. Addition and subtraction operations may be performed in a microprocessor architecture by sending an addition or subtraction uop to an execution unit where the uop is executed and the stack pointer is updated with the result. Therefore, in some prior art microprocessor architectures, a pop or push instruction may require at least two uops to be executed; one for the load or store operation and one for the stack pointer value subtraction or addition operation.

Other stack instructions may also access the stack, but performing a uop to update the stack pointer requires using processor resources and time that could be used processing other operations. Furthermore, performing at least two uops to perform a single pop or push instruction inhibits processor performance and increases power consumption.

BRIEF DESCRIPTION OF THE DRAWINGS

Embodiments and the invention are illustrated by way of example and not limitation in the figures of the accompanying drawings, in which like references indicate similar elements and in which.

DETAILED DESCRIPTION

Embodiments of the invention described herein pertain to a technique for reducing the number of micro-operations (uops) that must be executed in order to update a stack pointer. Furthermore, embodiments of the invention pertain to updating a stack pointer independently of executing a stack instruction, such as a pop or push instruction.

Figure 1:
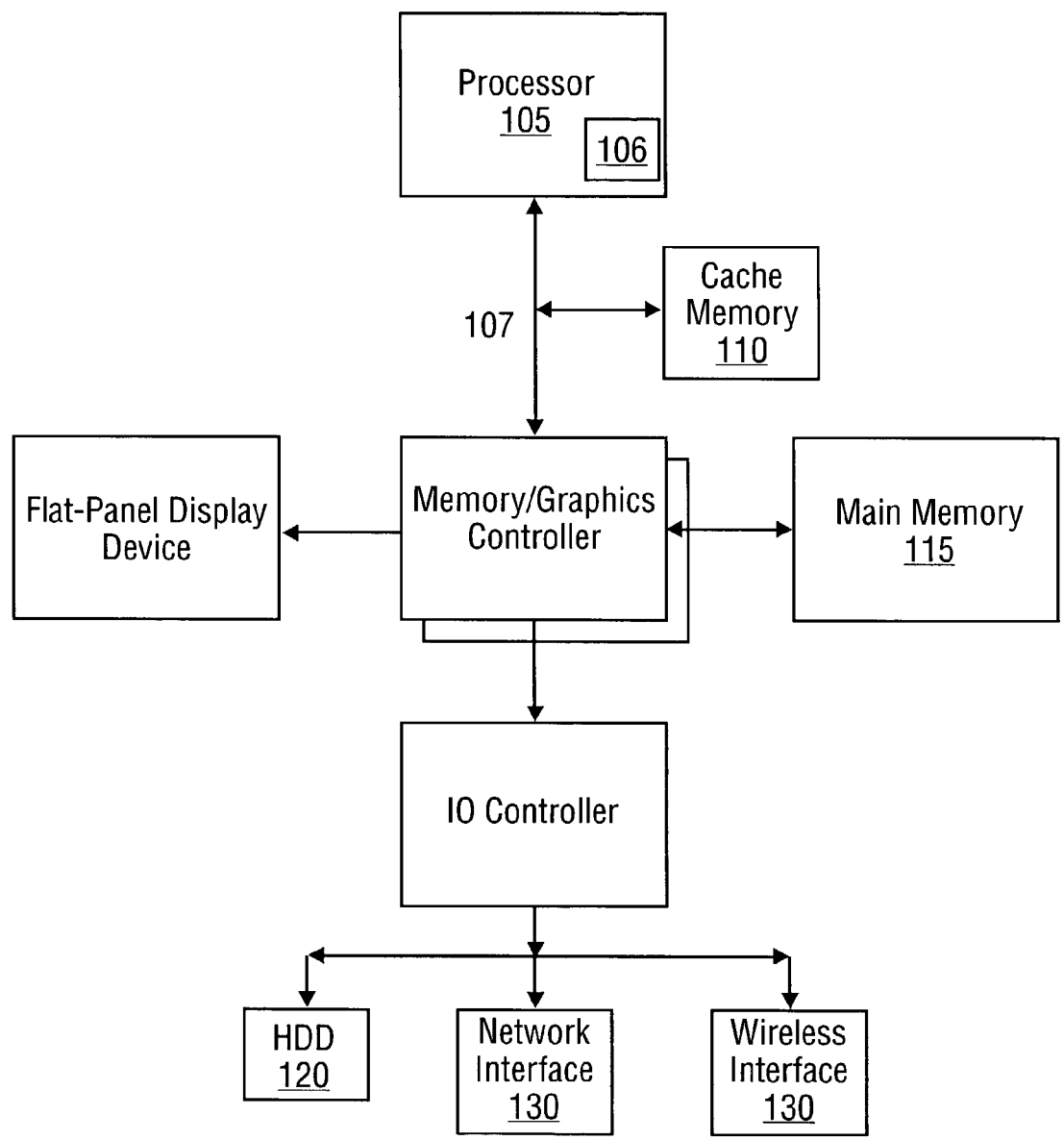
FIG. 1 illustrates a computer system according to one embodiment of the invention.

FIG. 1 illustrates a computer system that may be used in conjunction with one embodiment of the invention. A processor 105 accesses data from a cache memory 110 and main memory 115. Illustrated within the processor of FIG. 1 is logic 106 for implementing some portion of a stack-pointer architecture according to one embodiment of the invention. Some or all of the architecture may be performed in software, within the logic illustrated in FIG. 1, or a combination of software and logic. Furthermore, embodiments of the invention may be implemented within other devices within the system, such as a separate bus agent, or distributed throughout the system in hardware, software, or some combination thereof. The main memory may be implemented in various memory sources, such as dynamic random-access memory (DRAM), a hard disk drive (HDD) 120, or a memory source 130 located remotely from the computer system containing various storage devices and technologies. The cache memory may be located either within the processor or in close proximity to the processor, such as on the processor's local bus 107. Furthermore, the cache memory may contain relatively fast memory cells, such as a six-transistor (6T) cell, or other memory cell of approximately equal or faster access speed.

Figure 2:
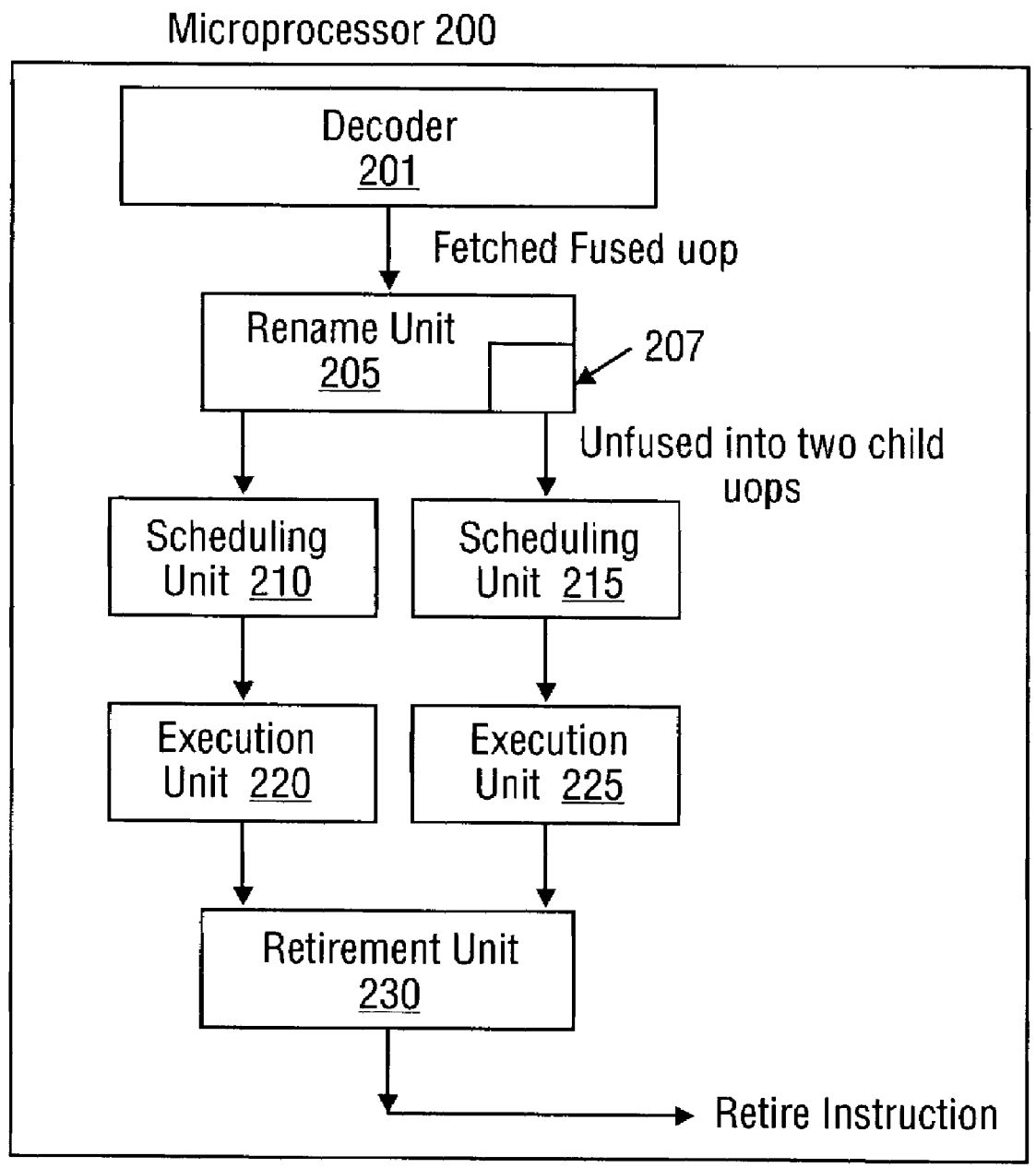
FIG. 2 illustrates a portion of a microprocessor architecture according to one embodiment of the invention.

FIG. 2 illustrates a portion of a microprocessor architecture according to one embodiment of the invention. Instructions, after being fetched, are decoded by the decoder 201 before they are sent to the rename unit 205. In the rename unit, the source and destination registers required by the individual uops of the instructions are assigned. The rename unit may further comprise or control a functional unit, such as a hardware circuit, to update a stack pointer according to one embodiment of the invention 207. Uops may then be passed to the scheduler 210, 215 where they are scheduled for execution by the execution unit 220, 225. After uops are executed they may then be retired by the retirement unit 230.

For other embodiments the stack pointer may be updated at different stages or areas of the microprocessor architecture, including the decoding logic.

Figure 3B:
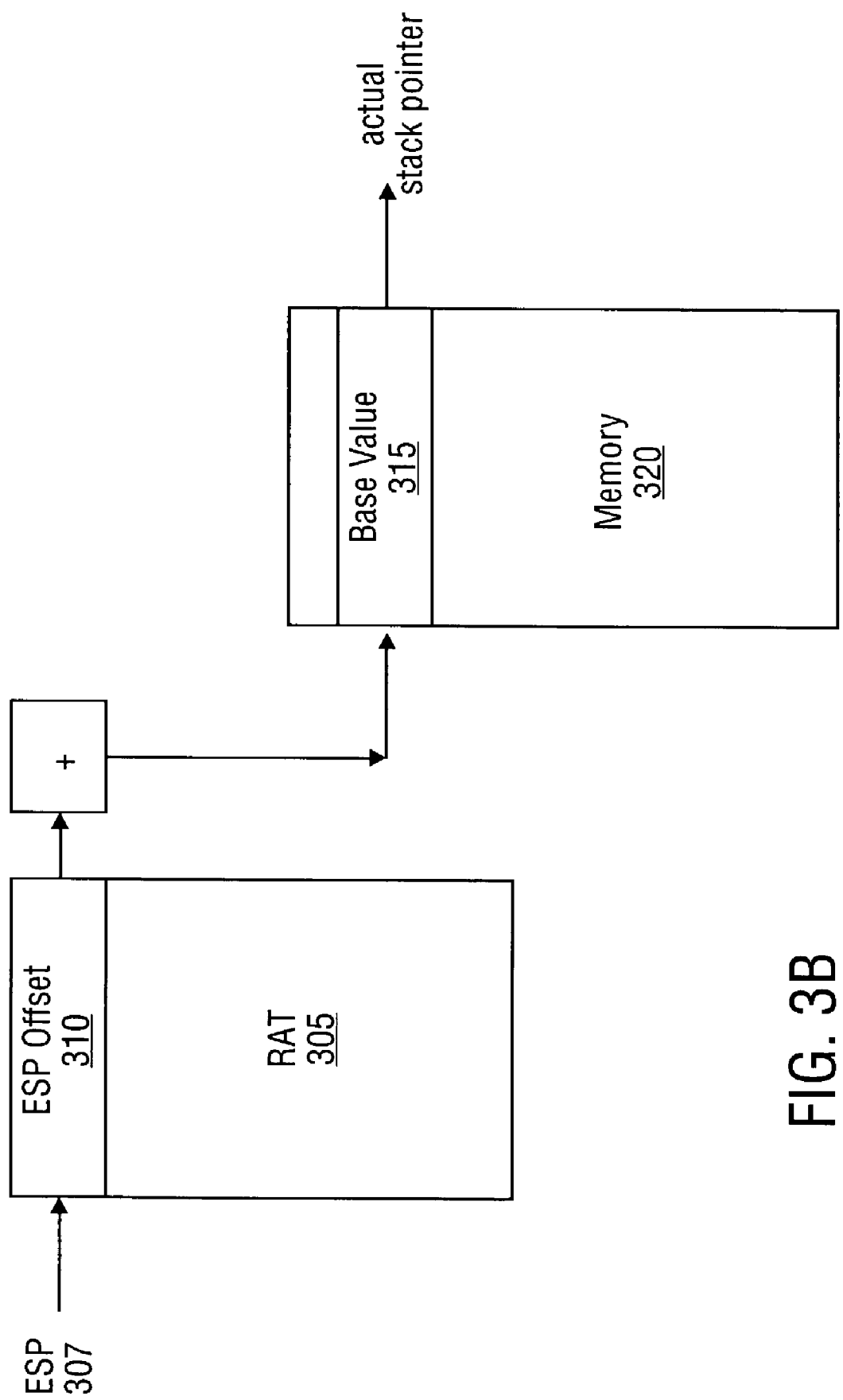
FIG. 3 illustrates a stack-pointer update architecture according to one embodiment of the invention.

FIG. 3 illustrates an architecture to perform a stack pointer update technique according to one embodiment of the invention. The embodiment illustrated in FIG. 3 includes a stack pointer offset register 301 to store a stack pointer offset value and an adder 303 to add a value to the stack pointer offset that corresponds to the size of data 306 to be either stored to or loaded from the stack. The size of the data may either be 16B or 32B depending upon the instruction set architecture. Other data sizes may be accommodated in other embodiments of the inventions according to the needs of the processor architecture.

The stack pointer offset register can be stored in a register address table (RAT) 305. The RAT is referenced by an address 307 corresponding to the location 310 of the stack pointer offset value within the RAT. The stack pointer offset value references an address location 315 in the memory 320 where a stack pointer base value is located.

Furthermore, a stack pointer offset value stored in the RAT can be added to or subtracted from 312 an immediate value 309, depending upon the location of the data in the stack to be accessed relative to the current value of the sum of the stack pointer base and the stack pointer offset. The amount by which the stack pointer offset is to change depends upon the data size of the value in the stack to be accessed. The stack pointer offset register will retain the sum of the stack pointer offset until the stack pointer offset is changed by the next instruction to access the stack.

When an instruction is accessed by the processor, the stack pointer architecture can detect 304 whether the instruction is intended to access the stack. For one embodiment of the invention, a bit field 302 is stored in stack access instructions to indicate whether the instruction is to access the stack, which the stack pointer update architecture can detect.

If the instruction is intended to access the stack, the data size 306 to be accessed is decoded from the instruction by the stack pointer update architecture and the data size value is summed with stack pointer offset value to update the stack pointer offset. The result is then summed with the stack pointer base value stored in a register file to calculate the correct stack address to be accessed.

FIG. 3 also illustrates a portion of a program that may be used in conjunction with one embodiment of the invention. In the example of FIG. 3, the stack access instruction is a pop instruction 308, which includes a load uop and a stack pointer update uop. Unlike in some prior art, however, there is no need to use subtract or addition instructions in the stack pointer update uop, which require execution by an execution unit in order to update the stack pointer. Rather, the stack pointer update uop adds the data size to the current value stored in the stack pointer offset register, without executing a uop to perform an addition or subtraction operation.

Because the stack pointer offset retains the last value of the updated stack pointer offset, other operations may need to reset the stack pointer to a known value before future operations can be executed. In order to accomplish this, the current value of the stack pointer may be read by summing the stack pointer base with the current stack pointer offset. Next, the stack pointer offset may be reset to a known value by adding an appropriate value to or subtracting an appropriate value from the current stack pointer value or resetting it to a starting address, such as zero.

For the embodiment illustrated in FIG. 3, the reset would be divided into two summing operations within the architecture illustrated: (1) summing the stack pointer base value and the stack pointer offset value, and (2) summing this result to the immediate value provided by the reset instruction. For example, the immediate value is 54, which is added to the current value of the stack pointer offset of 4, and this result is added to the stack pointer base value to calculate at the desired stack pointer value of 58.

For other embodiments, the stack pointer reset may be accomplished in fewer or more steps, depending upon available resources in the stack pointer update architecture. For example, in another embodiment, the architecture may comprise a 3-input adder that can add the immediate value, the stack pointer base value, and the stack pointer offset value at the same time rather in separate steps.

Updating, resetting, and reading the stack pointer value may performed without executing uops that may take valuable processor time and resources. Instead, embodiments of the invention may use standard complimentary metal-oxide-semiconductor (CMOS) circuitry within the rename unit of the processor to implement embodiments of the invention (hardware). Furthermore, the hardware may exist in other functional units of the processor, such as the decoding logic, or may reside outside the processor in a cache structure or other memory or a discreet device. Alternatively, embodiments of the invention may be implemented by the processor executing a set of machine-readable instructions to perform a method to perform embodiments of the invention (software). A combination of hardware and software may also be used to perform embodiments of the invention.

Figure 4:
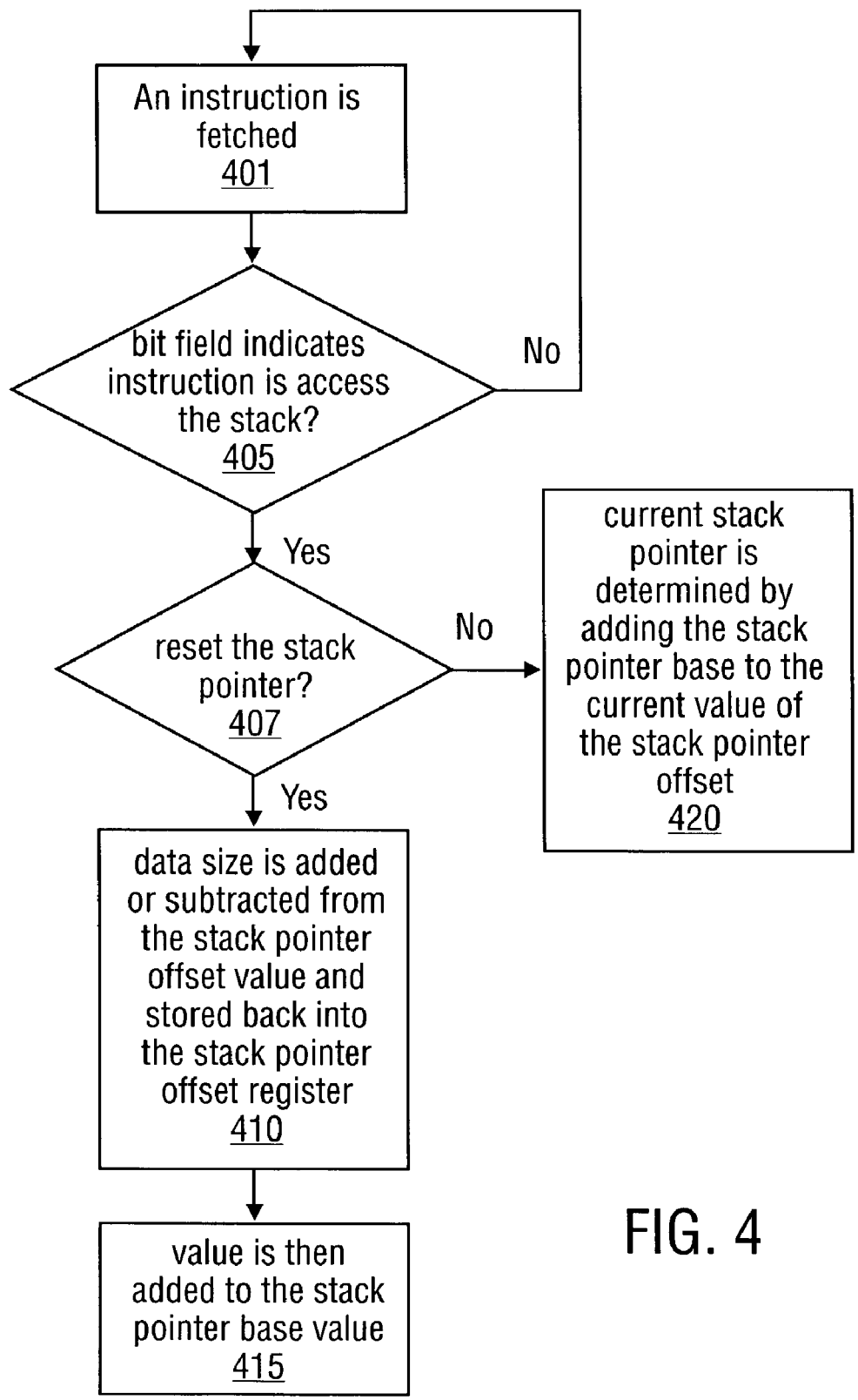
FIG. 4 is a flow chart illustrating a method updating a stack-pointer according to one embodiment of the invention.

FIG. 4 is a flow chart illustrating a method to perform one embodiment of the invention. An instruction is fetched at operation 401 from memory containing a bit field to indicate whether the instruction is intended to access the stack and therefore change the stack pointer. If the bit field is decoded at operation 405 to indicate that the instruction is intended to access the stack, the data size to be accessed in the stack is determined from the instruction. Once the data size is known, this value is added or subtracted at operation 410 from the stack pointer offset value and stored back into the stack pointer offset register. This new value is then added at operation 415 to the stack pointer base value in order to determine the correct stack entry or entries to be accessed. If the instruction is intended to reset the stack pointer at operation 407, the current stack pointer is determined by adding the stack pointer base to the current value of the stack pointer offset at operation 420. Once the current value of stack pointer is known an instruction may then increment or decrement the stack pointer to its intended value by adding the appropriate immediate value to the current value of the sum of the stack pointer offset and base values at operation 425.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. An apparatus comprising:
a first unit to execute a first instruction, the first instruction comprising a first micro-operation (uop);
a second unit to access a value in a memory in response to the first uop being executed by the first unit;
a third unit to update a pointer to the memory in response to decoding a first bit field within the first instruction without the first uop first being executed.

2. The apparatus of claim 1 wherein the third unit comprises a first storage unit to store a stack pointer offset value.

3. The apparatus of claim 2 wherein the third unit comprises a second storage unit to store a pointer to a stack pointer base value.

4. The apparatus of claim 3 wherein a stack pointer value is equal to the sum of the stack pointer base value and the stack pointer offset value.

5. The apparatus of claim 1 wherein the third unit is positioned to receive the first bit field before the first uop is executed by the first unit.

6. The apparatus of claim 5 wherein the first instruction is a pop instruction and the first uop is a load uop.

7. The apparatus of claim 5 wherein the first instruction is a push instruction and the first uop is a store uop.

8. A system comprising:
a memory unit to store a first instruction comprising a first micro-operation (uop), the first instruction comprising a bit field to indicate whether the first instruction will change a stack pointer when executed;

a processor to decode the bit field and update the stack pointer according to the first instruction without the first uop first being executed by the processor.

9. The system of claim 8 wherein the memory unit further comprises a second instruction to reset the stack pointer to an updated stack pointer value, the second instruction comprising a second uop to read a current stack pointer value and a third uop to change the current stack pointer by an immediate value.

10. The system of claim 9 wherein the processor comprises logic to add a base stack pointer value to an offset stack pointer value to yield the current stack pointer value after fetching the second instruction.

11. The system of claim 10 wherein the processor comprises logic to add the current stack pointer value to the immediate value to yield the updated stack pointer value after fetching the second instruction.

12. The system of claim 11 wherein the first instruction is a pop instruction and the first uop is a load operation.

13. The system of claim 11 wherein the first instruction is a push instruction and the first uop is a store operation.

14. The system of claim 11 wherein the first uop is a no-operation (nop).

15. A method comprising:
fetching a first instruction, the first instruction comprising a first micro-operation (uop) to access a stack and a bit field;
decoding the bit field in order to determine whether the first uop is to access the stack;
changing the stack pointer by a first value corresponding to a size of data to be accessed by the first uop without the first uop first being executed.

16. The method of claim 15 wherein the changing of the stack pointer comprises adding the first value and a stack pointer offset value and a stack pointer base value.

17. The method of claim 16 further comprising executing the first uop independently of the changing of the stack pointer.

18. The method of claim 15 further comprising fetching a second instruction to reset the stack pointer, the second instruction comprising an immediate value.

19. The method of claim 18 wherein the stack pointer is reset to a value to be determined by reading a stack pointer base value, adding a sum of the stack pointer base value and a stack pointer offset value to the immediate value.

20. The method of claim 17 wherein the first instruction is a pop instruction and the first uop is a load operation.

21. The method of claim 17 wherein the first instruction is a push instruction and the first uop is a push operation.

22. The method of claim 15 wherein determining a stack pointer value to which the stack pointer is to be changed does not require executing a uop.

23. A machine-readable medium having stored thereon a set of instructions, which when executed by a machine cause the machine to perform a method comprising:
decoding a bit field to indicate whether a stack painter is to be updated as a result of executing a first instruction;
determining an updated stack pointer value without the first instruction first being executed, the determining comprising adding a sum of a stack pointer base value and a stack painter offset value to a value corresponding to a size of data to be accessed by the first instruction.

24. The machine-readable medium of claim 23 wherein the size of data is 16 or 32 bytes.

25. The machine-readable medium of claim 24 wherein the bit field indicates that the stack pointer is to be updated if the first instruction is a push or pop instruction.

26. The machine-readable medium of claim 25 wherein the bit field is stored within the first instruction.

27. The machine-readable medium of claim 23 wherein the stack pointer offset value is changed by a value equal to a sum of the stack pointer offset value and the value corresponding to the size of data to be accessed by the first instruction.

28. The machine-readable medium of claim 23 wherein the stack pointer is updated by a second instruction being executed, the second instruction comprising an immediate value.

29. The machine-readable medium of claim 28 wherein the stack pointer is updated by reading the stack pointer base value and adding the immediate value to the sum of the stack pointer base value and the stack pointer offset value.

30. The machine-readable medium of claim 28 wherein the stack pointer is updated by reading the stack pointer base value and subtracting the immediate value from the sum of the stack pointer base value and the stack pointer offset value.

31. An apparatus comprising:
means for decoding a bit field to indicate whether executing a first instruction will change a stack pointer without the first instruction first being executed;
means for updating a stack pointer offset value in response to decoding the bit field;
means for determining a sum of a stack pointer base value, the stack pointer offset value, and a value corresponding to a size of data to be accessed by the first instruction;
means for storing the stack pointer base value and the stack pointer offset value;
means for resetting the stack pointer comprising a means for reading the stack pointer base value and a means a means for summing the stack pointer base value, stack pointer offset value, and an immediate value provided by a second instruction.

32. The apparatus of claim 31 wherein the first instruction is a pop instruction.

33. The apparatus of claim 31 wherein the first instruction is a push instruction.

* * * * *

UNITED STATES PATENT AND TRADEMARK OFFICE
CERTIFICATE OF CORRECTION

PATENT NO. : 7,080,236 B2 Page 1 of 1
APPLICATION NO. : 10/262214
DATED : July 18, 2006
INVENTOR(S) : Jourdan et al.

It is certified that error appears in the above-identified patent and that said Letters Patent is hereby corrected as shown below:

In column 6, at line 46, delete 1$^{st}$ occurrence of "a means".

Signed and Sealed this

Seventh Day of November, 2006

JON W. DUDAS
*Director of the United States Patent and Trademark Office*